US006571696B1

(12) United States Patent
Adam

(10) Patent No.: US 6,571,696 B1
(45) Date of Patent: Jun. 3, 2003

(54) HOME COMPACTOR

(76) Inventor: Claude Adam, rue du Fosteau 99, Thuin (BE), 6530

( * ) Notice: Subject to any disclaimer, the term of this patent is extended or adjusted under 35 U.S.C. 154(b) by 0 days.

(21) Appl. No.: 09/763,317

(22) PCT Filed: Aug. 16, 1999

(86) PCT No.: PCT/BE99/00110

§ 371 (c)(1),
(2), (4) Date: Feb. 16, 2001

(87) PCT Pub. No.: WO00/10798

PCT Pub. Date: Mar. 2, 2000

(30) Foreign Application Priority Data

Aug. 19, 1998 (BE) .............................................. 9800611
Mar. 16, 1999 (BE) .............................................. 9900193

(51) Int. Cl.[7] ................................................ B30B 1/00
(52) U.S. Cl. ...................................... 100/214; 100/902
(58) Field of Search .......................... 100/50, 214, 265, 100/266, 290, 293, 902

(56) References Cited

U.S. PATENT DOCUMENTS

| 3,009,414 A | 11/1961 | Griemert ..................... 100/293 |
| 3,079,856 A | 3/1963 | Swartz ......................... 100/50 |
| 3,388,422 A | 6/1968 | Benoit ............................. 17/2 |
| 4,334,469 A | 6/1982 | Tanner et al. ................ 100/110 |
| 5,243,903 A | 9/1993 | Blackmer et al. ............ 100/102 |
| 5,765,473 A | 6/1998 | Gummelt ..................... 100/266 |
| 5,775,213 A | * 7/1998 | Hyde .......................... 100/902 |
| 5,848,569 A | * 12/1998 | Maki et al. .................. 100/902 |

FOREIGN PATENT DOCUMENTS

| DE | 91 15 065 U | 3/1992 |
| EP | 0 554 646 A | 11/1993 |
| FR | 2 689 034 A | 10/1993 |
| FR | 2 750 073 A | 12/1997 |
| JP | 9234597 A | 9/1997 |

* cited by examiner

Primary Examiner—W. Donald Bray

(57) ABSTRACT

The invention concerns a compactor for empty containers consisting of a fixed frame (1) and a mobile element (2) integral with the frame but capable of sliding inside or outside the fixed frame, and of receiving the container (12) between an upper part of the fixed element (7) forming an anvil and a part of the mobile element forming a compressing member. The mobile element can be subjected to a vertical downward force. Said force is applied on the lower part of mobile element (9) by the user's foot. Said lower part forming a pedal is located underneath the fixed frame top part to cause the mobile element (2) to slide and compress the container between the opposite surfaces of said upper parts.

14 Claims, 5 Drawing Sheets

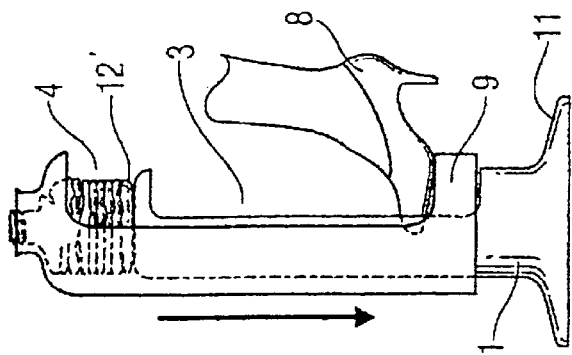
Fig. 1A
Fig. 1B
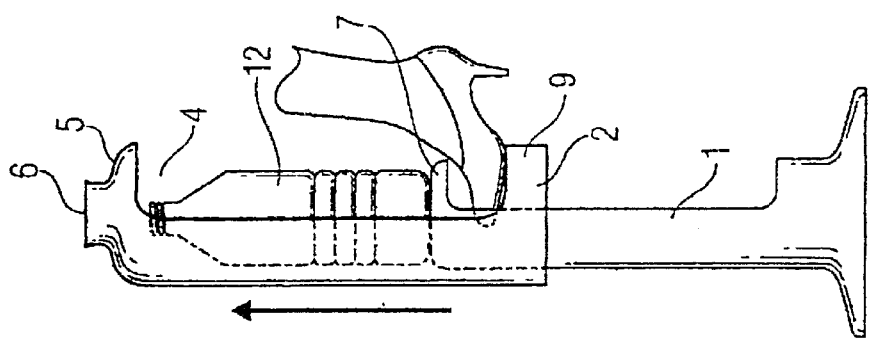
Fig. 2
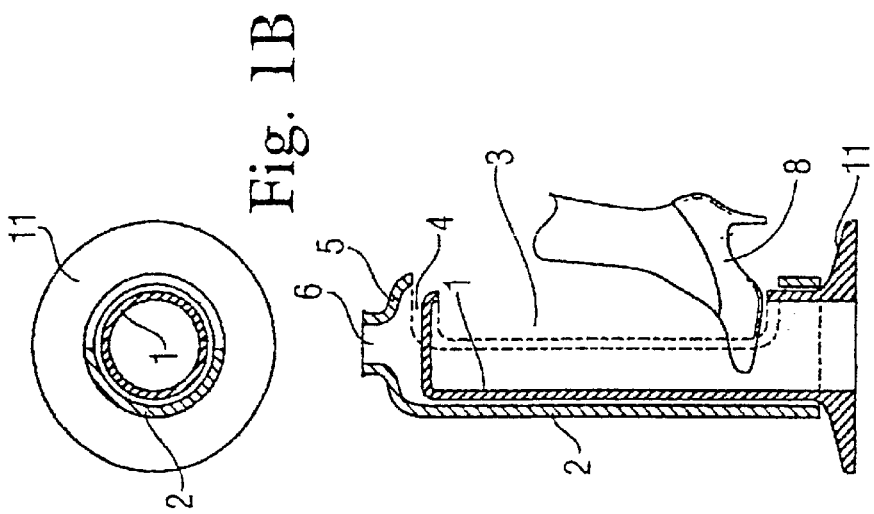
Fig. 3

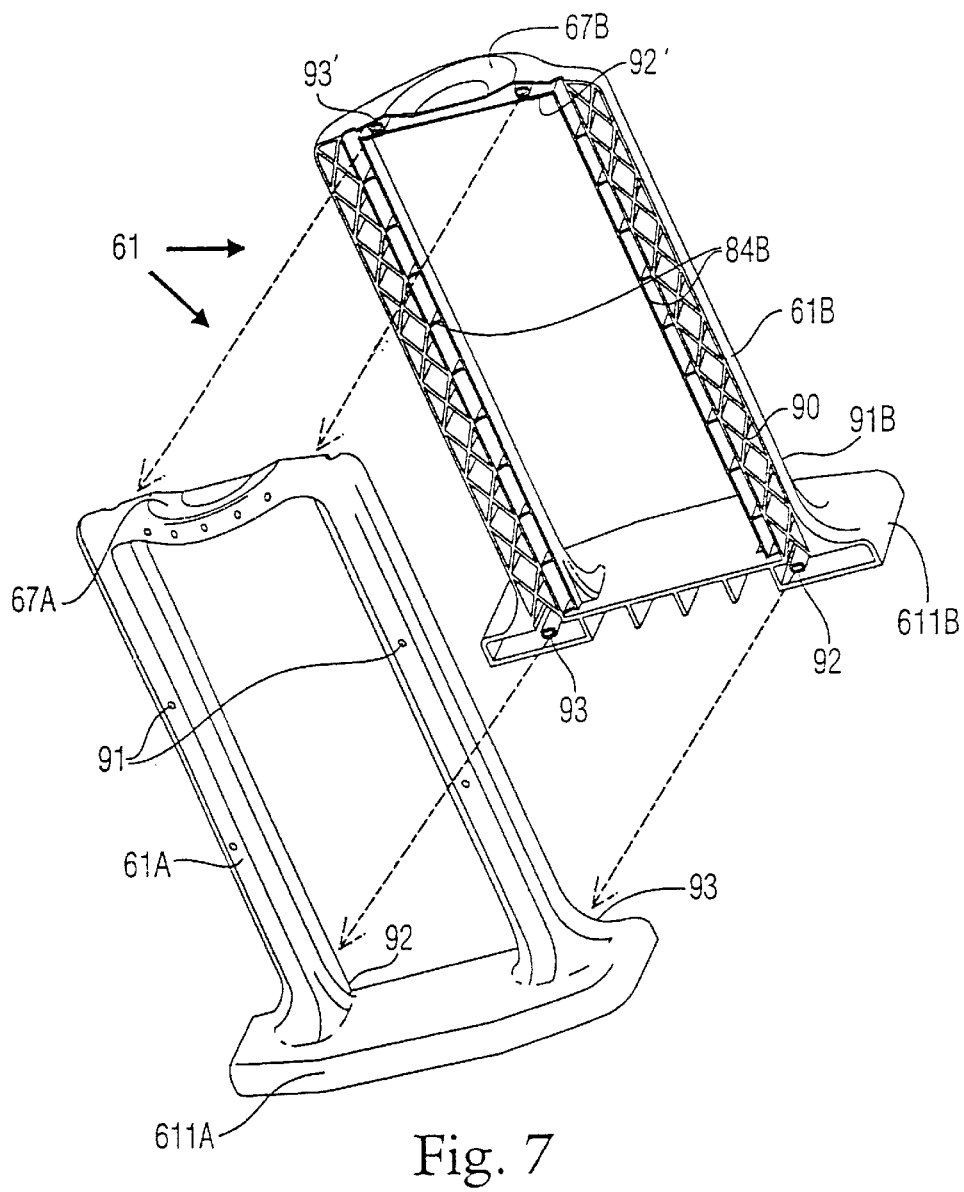
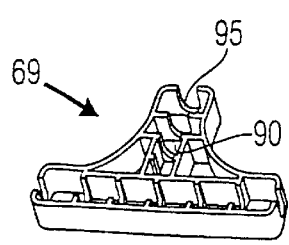
Fig. 8B
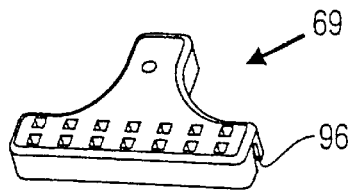
Fig. 8A
Fig. 7

HOME COMPACTOR

BACKGROUND OF THE INVENTION

1. Field of the Invention

This invention relates to a compactor, or crushing device, for compressible containers, in particular in plastic, in metal or in cardboard.

2. Description of Related Art

The compactor according to the invention can advantageously, but not only, be intended for domestic use and can thus constitute a particularly practical utensil within reach of the housewife.

It is known that the use of plastic bottles has come into general use, as well as the use of metal tins ("cans") for drinks. Once empty, these containers are bulky and it is therefore often necessary to decrease their volume. Different compactors exist for this purpose, nevertheless having various disadvantages.

The former state-of-the-art is in particular represented by the patent documents U.S. Pat. No. 3,009,414, FR-A-2689034, FR-A-2750073, EP-A-0554646, JP 9234597 and U.S. Pat. No. 5,765,473.

SUMMARY OF THE INVENTION

The purpose of this invention is to put forward a simpler and nevertheless more efficient, lighter, more compact and stronger compactor, essentially for containers intended for liquids. This operation causes the crushing of all containers placed between the two elements.

According to the invention a compactor is indeed put forward consisting of a fixed frame and a mobile element, integral with the frame but capable of sliding through a part of the fixed frame. In its extend or open form, the compactor can receive a container between the upper part of the fixed element, playing the role of an anvil and an upper part of the mobile element playing the role of a plunger piston. The mobile element is then subjected to a downward vertical force, this force is applied to its lower part, present below the upper part of the fixed element. The container is thus compressed between the two upper parts, between their opposites surfaces, by a force exerted downward in a point located at the lower part of the sliding mobile element, located above the lower part of the fixed element.

The force on this mobile part is advantageously exerted by the user's foot, the fixed frame being placed on the floor.

The principle on which an aspect of this invention rests, consists in compressing a container by exerting a force with the foot, and therefore potentially with the weight of the user's body, the foot being situated below the container and exerting its force on a stirrup or a pedal comprising at least one arm directly connected to the mobile compressor element located above the container, the arm(s) sliding in a fixed frame on which the aforesaid container is placed.

The sliding part comprises an upper compressor element, for example in the form of a plate or a ring, capable of vertically compressing the container. This element can more or less partially conform in shape to the upper part of the container in order to maintain the vertical stability of this during the compression. The annular element of the plate can thus advantageously have an opening capable of receiving the neck of a plastic bottle.

The upper compressor element is connected, preferably rigidly, to a lower bearing plate, playing the role of pedal. The connection can be effected by one or several arms in the form of rods or tubes sliding in an upper part of the fixed frame, the aforesaid frame being at least partially open and housing the bearing element on which the compression force is exerted. The rods or tubes can be metallic.

Advantageously the connection can also result from a lateral part of a cylindrical wall sliding on an additional lateral part of the fixed frame.

The frame or fixed part contains the bearing element and is capable of containing it during its stroke at the time of the compression operation. The fixed frame has a lateral recess capable of enabling the foot to exert its force during the entire stroke of the sliding element. The frame advantageously comprises a base for providing its stability on the floor.

The fixed frame can be implemented in rigid plastic, for example in the form of two identical, molded and assembled, half body shells possibly having internal reinforcement ribs. According to one embodiment, these assembled half bodies can contain lateral internal guides, for example in the form of channels or grooves, in order to enable an easy sliding of the tubes or rods of the sliding part connecting the compression plate and the pedal.

BRIEF DESCRIPTION OF THE DRAWINGS

The invention will be better understood and the advantages of this will appear more clearly in the course of the explanatory specification that follows and submitted with reference to the attached schematic drawings, only provided by way of example in order to illustrate embodiments of the invention.

In these drawings:

FIGS. 1a and 1b are cross-sectional drawings of a compactor according to the invention;

FIG. 2 is a view representing the compactor from FIG. 1 extended in order to receive a bottle to be compacted and to enable the initial insertion of the user's foot;

FIG. 3 represents the compactor in lowered position and in which the bottle is crushed and the foot in stroke-end position;

FIG. 7 represents the fixed frame from FIG. 6 formed out of two identical half shells to be assembled;

FIGS. 8a and 8b illustrate a pedal viewed from above and viewed from below respectively.

DESCRIPTION OF PREFERRED EMBODIMENTS

Figure 4C:
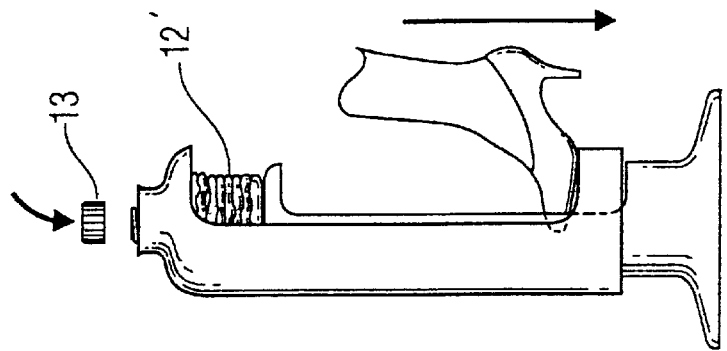
FIG. 4 schematically represents a variant in which the tubular bodies are replaced by an upturned approximately U-shaped double armature of which the bases slide into one another.

FIG. 1a is a cross-sectional elevation drawing of a compactor according to one embodiment of the invention.

FIG. 1b is a cross-sectional top view.

As appears from these figures, the plastic bottle compactor consists of a tubular body 1 whose base 11 is placed on the floor, the upper part 5 is at least partly enclosed. The lateral cylindrical wall has an elliptic vertical long opening cut-out 3 extending laterally to approximately half the cylindrical wall, enabling the insertion and the downward thrust of the front part of the user's foot.

Around the tubular body 1 slides the tubular body partially closed on top 2, its lateral cylindrical wall also has an elliptic vertical long opening cut-out 4 similar and complementary to the opening of the tubular body 1.

The uncapped bottle 12 is engaged upright in the opening 4 by raising the tubular body 2 by hand, the neck capable of partially engaging in the upper part 5 provided with an appropriate opening 8.

This opening 4 also receives the foot 8 in its lower part right below the upper part 7 of the cylindrical body The vertical thrust exerted by the foot on the cut-out lower edge 9 of the cylindrical wall of the tubular body 2 makes this descend and thus compresses the bottle between the opposite surfaces of the upper part 5 and of the top upper part of the tubular body 1 and the bottom of the upper part of the tubular body 2.

The upper base of the tubular body 2 is provided with a circular opening 6 that centers the neck of the bottle during the crushing and enables the previously removed cap to be replaced, which still improves the result of the crushing.

Figure 4B:
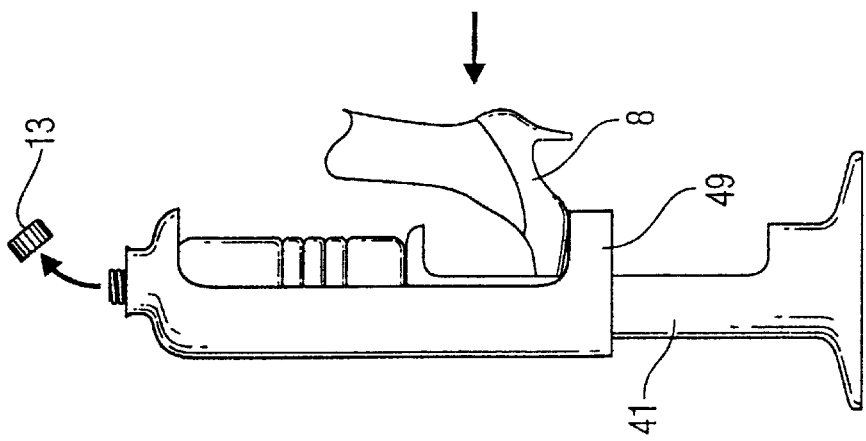
Figure 4A:
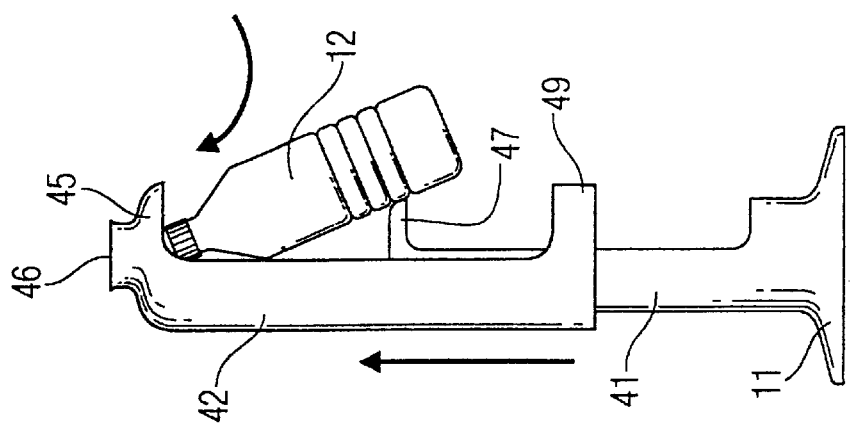

FIGS. 4a and 4b illustrate the crushing operation of a bottle with a compactor that constitutes a variant of the invention. The element 41 is no longer a tubular body but constitutes a vertical upright on which a second vertical upright 42 slides, the two extremities of the uprights 41, 42 being provided with perpendicular elements capable of wedging a container between the upper element 47 of the fixer upright 41 and an upper element 45 of the sliding upright 42. The downward sliding of the upright 42 results from the pressure of the foot 8 on the element 49 forming a pedal and causes the crushing of the bottle 12.

Figure 5:
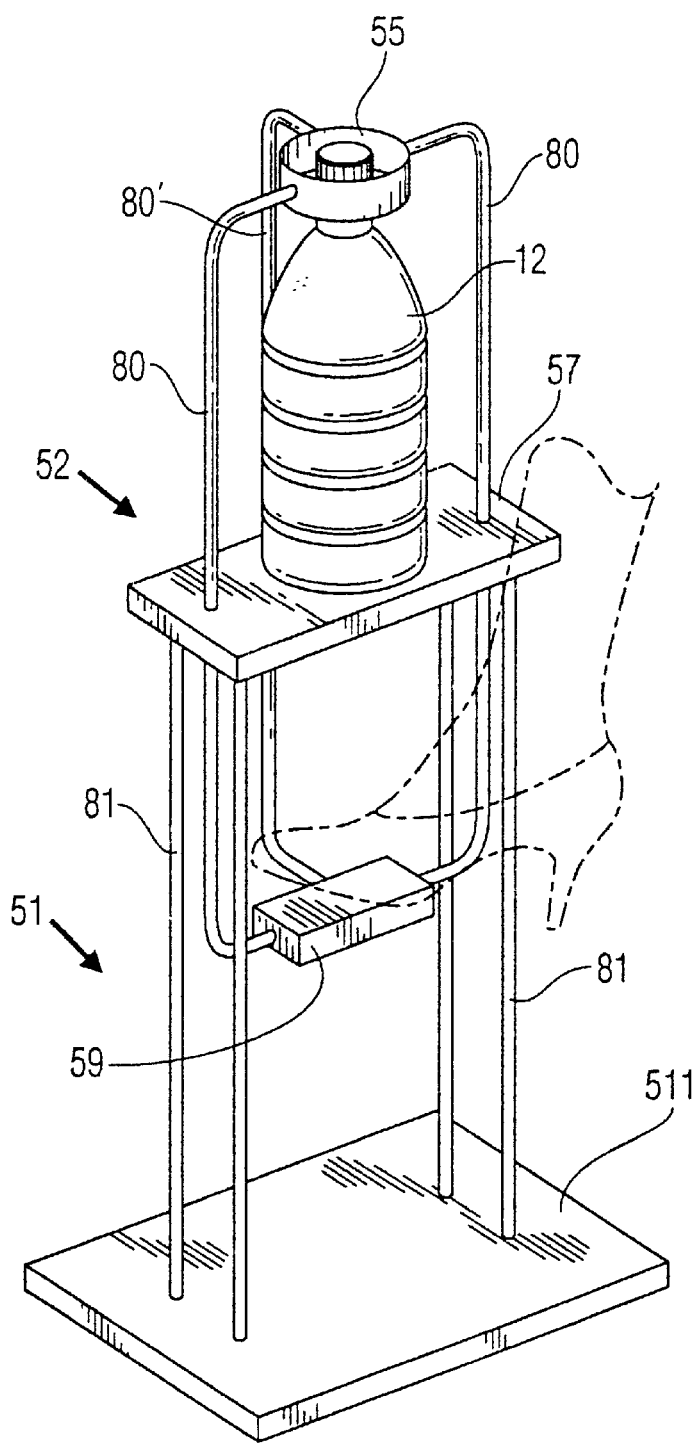
FIG. 5 schematically represents another variant in which the tubular bodies are replaced by bent metallic tubes, supporting an annular element for receiving the neck of the bottle, a supporting element for receiving the base of the bottle and a bearing element for exerting the vertical force with the foot.

FIG. 5 illustrates yet another embodiment of the invention, the sliding parts 51 and 52 essentially being formed of metallic rods or tubes. The sliding element 52 consists of 3 parallel tubes 80, bent at the extremities and connecting an upper ring 55 and a lower pedal 59. The tubes slide through an upper plate 57 that is itself connected by 4 rigid parallel rods 81 to a base 511 thus together forming the fixed frame 51. The container is compressed between the ring 55 and the upper surface of the plate 57 that forms an anvil.

Figure 6A:
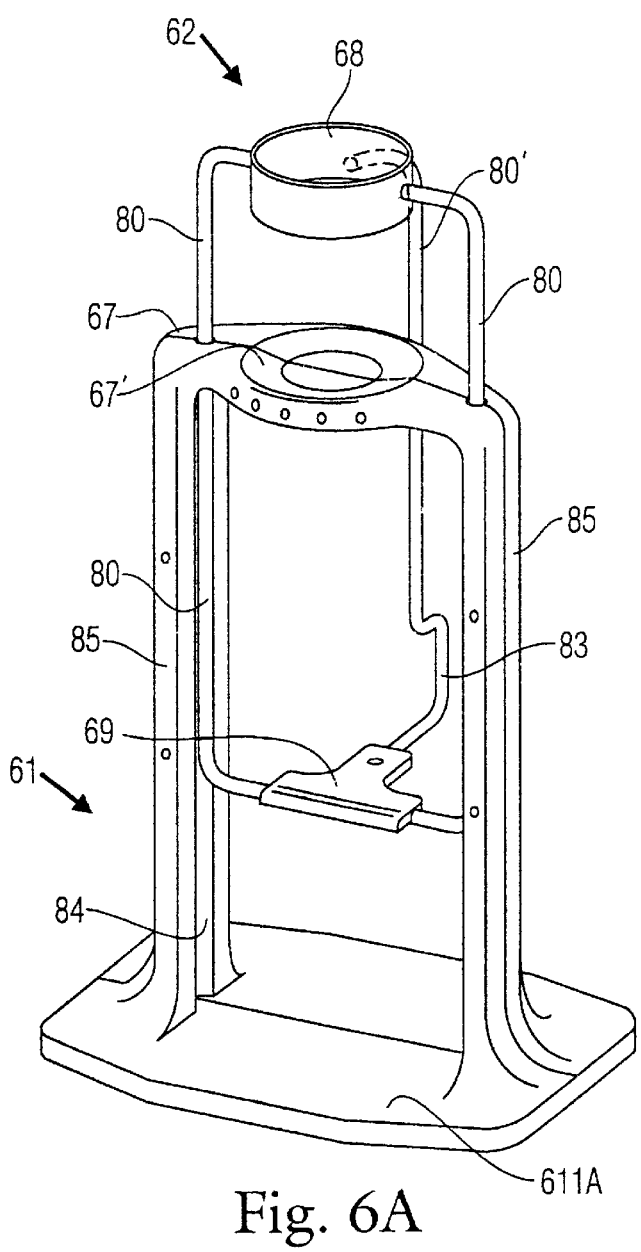
FIG. 6a represents another variant of a compactor according to the invention.
Figure 6B:
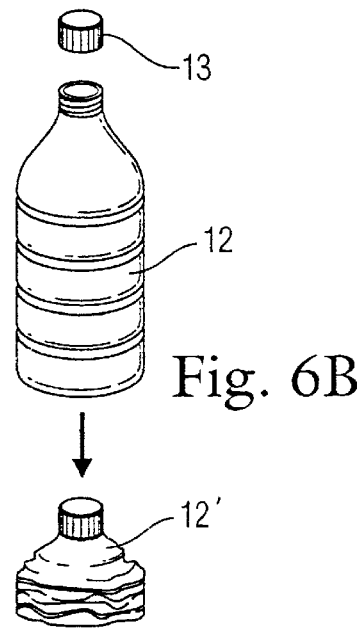
FIG. 6b shows a screw cap container before and after compression.
Figure 6C:
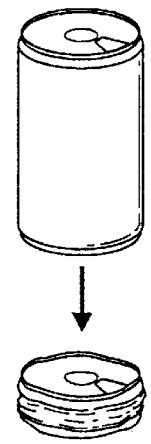
FIG. 6c shows a can before and after compression.

FIG. 6 represents yet another embodiment of the invention. The frame 61 is a rectangular structure disposed on a bare 611. In this structure two tubes 80 slide in guiding channels 84 provided opposite in the uprights 85. These tubes connect the ring 68 and the pedal 69. A hollow 67' in the upper surface 67 of the fixed frame can be seen, capable of better conforming in shape to the bottom of the container to be compacted. The third rod 80' of the sliding part of the compactor has the characteristic of being outwardly recessed at its lower part 83 so as to enable a deeper insertion of the sole of the user's foot.

FIGS. 7a and 7b illustrate a particularly advantageous embodiment for manufacturing a compactor according to FIG. 6. It will indeed be noted that the fixed frame can consist of two identical injection molded pieces 71 and 71' assembled with screws in 91, parts 92 projecting with a piece that moreover adapts to openings 93 on the complementary piece and vice versa.

FIGS. 8a and 8b illustrate the stirrup-shaped pedal similar to that represented by 69 in FIG. 6a, viewed respectively from above and from below.

The rest of the compactor consists of metallic elements (ring and bent rods) that can easily be mounted, for example by clipping together, prior to final assembly of the half body shells 71 and 71', in the seatings 84, 95, 96 provided on the frame and the pedal as experts will understand.

It is obvious that numerous variations in details can be provided in the scope of the invention, the protection sought only being limited by the formulation of the claims.

Thus, for example, the compactor could be provided in order to receive a bottle in inversed position, in other words neck downward, which can be advantageous for certain applications (complete emptying of the content of the container).

It will also be understood that the invention more generally reveals a compression device for compressible material comprising two elements, e.g. vertical tubular bodies sliding into one another, the upper element being at least partially closed at its two extremities and the lower element being at least partially closed at its upper extremity, the aforesaid elements each having at least one lateral recess enabling on the one hand the insertion of the compressible material in the upper element extended by sliding and on the other hand the sole of a foot on the lower extremity of the aforesaid upper element sliding in or around the fixed lower element.

What is claimed is:

1. A compactor for containers consisting of a fixed frame and a mobile element, the fixed frame having an upper part, the mobile element having an upper part and a lower part, a bearing element being provided on the lower part of the mobile element, the mobile element being slidable with respect to the fixed frame, one of the containers being received between the upper part of the fixed frame and the upper part of the mobile element, wherein a downward vertical force applied to the bearing element on the mobile element slides the mobile element with respect to the fixed frame, compressing the one of the containers between the upper part of the fixed frame and the upper part of the mobile element.

2. Compactor according to claim 1 comprising lateral parts and wherein the lateral parts of the frame and the mobile element consist of at least one metallic vertical rod.

3. Compactor according to claim 1 characterized in that the mobile element and the frame consist of tubular bodies having cylindrical walls, the mobile element and the frame sliding into one another and a part of the cylindrical wall of the mobile element and of the frame having been cut out longitudinally.

4. Compactor according to claim 1 characterized in that the frame and/or the mobile element has a partially hollowed-out tubular structure capable of receiving the container.

5. Compactor according to claim 1 wherein the upper part of the sliding element is shaped in a manner so as, at least partially, to receive the neck of a bottle.

6. Compactor according to claim 1 characterized in that the upper part of the sliding element comprises a centered opening for receiving the neck of a bottle.

7. Compactor according to claim 1 wherein that the upper part of the sliding element comprises an annular-shaped element having an internal diameter and wherein the internal diameter of the annular-shaped element is slightly less than the diameter of a can.

8. Compactor according to claim 1 wherein the upper part of the fixed frame has an upper surface having a shape to at least partially receive the bottom of a longitudinal container.

9. Compactor according to claim 1 wherein the fixed frame and the mobile element are of approximately equal dimensions in height.

10. Compactor according to claim 1 wherein the frame has a base.

11. Compactor according to claim 1 wherein the fixed frame is formed out of two identical molded half body shells.

12. Compactor according to claim 1 wherein the fixed frame has vertical grooves formed therein, the mobile element has at least two parallel tubes sliding in the grooves in the fixed frame, said tubes connecting an upper element forming a compression element and a lower element forming the bearing element for the downward exerted force.

13. Compactor according to claim 12 wherein the bearing element is in the form of a pedal.

14. Compression device for compressible material comprising an upper vertical tubular body and a lower vertical tubular body, said bodies being slidable into one another, the upper vertical tubular body having opposite upper and lower ends, both ends being of at least partially closed, the lower vertical tubular body having an upper end and a lower end, the upper end having at least partially closed, the upper and lower vertical tubular bodies each having a cooperating opening formed therein, wherein the compressible material is inserted in the opening on the upper vertical tubular body and supported on the upper end of the lower vertical tubular body wherein downward force applied to the lower end of the upper vertical tubular body slides the upper vertical tubular body downwardly with respect to the lower vertical tubular body, compressing the compressible material between the upper end of the lower vertical tubular body and the upper end of the upper vertical tubular body.

\* \* \* \* \*